United States Patent [19]
Goreta

[11] Patent Number: 5,973,747
[45] Date of Patent: Oct. 26, 1999

[54] TELEVISION PROGRAM MANAGEMENT SYSTEM

[75] Inventor: Lucas Goreta, Lyons, France

[73] Assignee: Henley Trading Limited, Dublin, Ireland

[21] Appl. No.: 08/666,565

[22] PCT Filed: Dec. 12, 1994

[86] PCT No.: PCT/FR94/01452

§ 371 Date: Jun. 14, 1996

§ 102(e) Date: Jun. 14, 1996

[87] PCT Pub. No.: WO95/17074

PCT Pub. Date: Jun. 22, 1995

[30] Foreign Application Priority Data

Dec. 15, 1993 [FR] France .................................. 93 15515

[51] Int. Cl.$^6$ .............................. H04N 7/00; H04N 11/00
[52] U.S. Cl. .......................... 348/460; 348/468; 348/906
[58] Field of Search ................................... 348/460, 468, 348/906, 564, 555, 461; H04N 7/00, 11/00

[56] References Cited

U.S. PATENT DOCUMENTS

| | | | |
|---|---|---|---|
| 4,977,455 | 12/1990 | Young | 358/142 |
| 5,195,130 | 3/1993 | Weiss et al. | 379/98 |
| 5,253,066 | 10/1993 | Vogel | 358/188 |
| 5,486,865 | 1/1996 | James | 348/465 |
| 5,552,833 | 9/1996 | Henmi et al. | 348/460 |

FOREIGN PATENT DOCUMENTS

| | | |
|---|---|---|
| 0 460 520 A1 | 11/1991 | European Pat. Off. . |
| 0 503 070 A1 | 9/1992 | European Pat. Off. . |
| 0 572 090 A3 | 12/1993 | European Pat. Off. . |
| WO 91/00670 | 1/1991 | WIPO . |

*Primary Examiner*—Nathan Flynn
*Assistant Examiner*—Vivek Srivastava
*Attorney, Agent, or Firm*—Herbert Dubno

[57] ABSTRACT

A television program management system capable of downloading, displaying and processing data relating to various television programs and for outputting commands for changing channels etc. on the basis of this date- The system has a programmable processing unit connected with an interface and a program memory. The programmable processor has connections that control the display and a switching device between the program processor and a processing and treatment device. The display may be a teletext display.

8 Claims, 5 Drawing Sheets

TELEVISION PROGRAM MANAGEMENT SYSTEM

CROSS REFERENCE TO RELATED APPLICATIONS

This application is a national phase of PCT/FR94/01452 filed Dec. 12, 1994 and based, in turn, upon French National application 95 155 15 filed Dec. 15, 1993.

FIELD OF THE INVENTION

The present invention relates to a system for managing television programs.

BACKGROUND OF THE INVENTION

There are several systems allowing a television viewer to be informed about the programs on the different channels he can receive and eventually to easily choose the channels to record. In any case the existing systems are mainly limited to displaying on the television screen data such as the number of the channel to which the receiver is tuned or other information or messages in overlays. In general these systems do now allow an automatic selection from the choice of programs and a selection (or starting signal) of the program automatically selected based on downloaded data. in other words the current systems allow one to obtain and display information but they are incapable of automatically triggering based on this information a particular action wanted by the television viewer (see for example documents WO 91 00 670 and EP 0,572,090).

Programming systems are also known for televisions which allow one to select in advance a channel number and the starting and ending times of programs, but these programming systems only use data inputted manually by the television viewer and cannot taken into account other pre-existing or external data such as the type of show or whether it is being aired simultaneously with another show of interest to the same viewer (simultaneous shows).

Other known systems using teletext are conceived only for automatic starting at the appropriate time of the recording of a show on a videocassette recorder, see for example EP 0,503,070 and EP 0,460,520. In particular these systems do not exercise any control over the television itself such that their possibilities remain limited.

OBJECT OF THE INVENTION

The object of the present invention is to avoid the insufficiencies or inconveniences of the current systems and to supply a global television-program management system as a modular and economical system ensuring the reception and display of programs that can be received in a given place, the selection of these programs mainly as a function of the types of shows, the automatic control of the various operations of the television taking into account complementary data entered by the viewer (programming of the television), and also eventually the management of a videocassette recorder connected to the television in question.

SUMMARY OF THE INVENTION

To this end the invention is a system for managing television programs which comprises essentially, in combination: means for transmitting data relative to the programs according to a preestablished format of the teletext or similar type, means for receiving, decoding, storing, and displaying the data also of the teletext or similar type integrated into a television or associated therewith, a programmable processing unit for this data for controlling the operation of the television and/or of an associated apparatus such as a videocassette recorder based on this data, and interface means allowing selection and operations, the data about the programs being loaded into a specific memory termed the program memory connected to the receiving, decoding, and display means for this data.

The programmable processing unit is formed mainly by a specific processor which is connected with the program memory and which itself has an erasable memory allowing the downloading of variable data having to do with the programs of the television channels as well as recording of the choices effected by the viewer.

This processing unit is connected to an existing display of the teletext or similar type of which it uses the functions or even the teletext or similar functions being incorporated in the system.

This processing unit is in addition, connected to existing control means of the television for selecting the channel being watched.

The data-transmitting and data-receiving means as well as the display of this data here being of the well known teletext system, integrating them into the system of the invention offers above all extended possibilities of application both from the information point of view as well with respect to automatic control of operations based on the data received and processed, operations such as: automatic changing of the television channel, the starting or stopping of a videocassette recorder, the selective display of certain data or certain messages mainly as a function of an identification code incorporated in the processor, or of programming chosen directly by the transmitter or by the viewer or even in an interactive way between the transmitter and the user in real or offset time. More particularly the system can automatically control in an order received from the transmitter of data and/or as a function of preselections of the viewer, operations involving the transmission of a signal indicating the start of a selected show on a channel other than that currently being watched or the automatic switching of the television to the channel selected.

The transmission of data about the programs between the transmitter and the receiver can be ensured by the image transmission pathway and/or by a telephone connection. Whatever the transmission path the received data mainly about the programs of the different television channels is loaded into the specific memory (program memory) connected to the means for receiving, decoding and displaying this data, this memory being of a size sufficient to accommodate the nature and the quantity of the data that needs to be received and stored.

The assembly formed by the television, including its remote controller, and by the system of the invention also includes means for remotely controlling the display on the television screen of the information such as all the programs and/or programs selected by the viewer, this display of information taking place alone or superposed on the image of the show being watched.

In the case of use with a telephone connection between the data transmitter and the means for receiving, decoding coding, storing, and displaying the data, the system also advantageously has, at the television, means for generating audio signals and for sending these signals over the telephone line, this means being connected with the processor. Such an assembly is thus made interactive and in this case it mainly uses DTMF signal generators allowing the sending of seven different signals either from a standard telephone keypad or from a special keyboard integrated in the remote controller of the television. The viewer can thus connect to a server and conduct a dialog, reply, reserve, etc. with the help of his remote controller and with the aid of the seven basic signals (or more numerous signals obtained by combining the basic signals) that it can generate.

According to a complementary possibility always connected to the existence of a telephone connection, the system also has means for generating or transmitting audio signals based on a smart card, mainly a DTMF smart card, in order to permit games playing or prepaid or billable operations with identification of the viewer.

The different main and optional components of the television-program management system of the invention can be integrated (wholly or in part) in the television or can be mounted in a special external housing. These components can be to some degree a part of an existing teletext-type data display or can include elements of the teletext type necessary for its operation.

While remaining simple and inexpensive, mainly because of its modular construction, the system of the invention offers rich and numerous possibilities:

In the first place this system ensures simple reception, of the alphanumeric and graphic type, of data relative to the programs with the times and content of the shows of all the television channels received by the viewer at the location where the television is and the display of these programs on demand on the television screen itself and/or on a special remote-controller housing equipped with a small view screen. If necessary the system can show and process in local time the times of the shows for which the reference hour is different (foreign transmissions mainly sent by satellite).

In addition the data sent and received can be organized and sorted according to the type of show, the starting and ending hours of the transmissions, and other more particular data necessary to identify the shows and to allow their selection according to certain criteria. To this end the transmitter sends out data relative to the programs in a standardized way, this data being sorted with preestablished codes so as to allow its identification and processing, the codes allowing various operations such as the automatic control of the television as well as interactive functions. By way of example the system can provide:

a specific recognition code activating the storing of the data and its transmission to the erasable memory dedicated to this purpose;

a code for the name or number of the television channel;

a code defining the type of show, such as a film, sports rebroadcast, news, etc. and, if possible, the type of show (example type of film, type of sport);

a control code for the direct operation of the television, in particular: authorization or blocking of a show, automatic starting of the television and/or of the videocassette recorder at the exact starting time of a predetermined show, stopping of the recording on the videocassette recorder during transmission of advertisements...;

The processing unit regularly interrogates the receiver of the data in question for all the channels received by the television and stores in memory the data relating to them.

Thanks to this data and to the associated codes, the system will be able mainly to:

sort the programs by type and propose to the viewer a selection of shows of a given type, perhaps augmented by shows of a related type;

manage overlapping shows by warning the viewer of possible conflicts while proposing in this case that one of the programs be recorded;

block certain types of shows, for example shows that are not suitable for children, or block use of the television at certain hours of the day;

conduct a search of shows starting with the type or name (complete or partial) and of complementary data, for example asking the system if on a certain day or in the week there is a film with a certain actor;

control a videocassette recorder based on the functions of the system, the programming of the videocassette recorder being done by choosing programs directly on the screen based on a display of the programs. The system knows the time and duration of each shows and is capable of managing the length of the recording cassette as well as any eventual show conflicts. It also allows the storing of the contents of each cassette while holding in memory the names, dates, times, durations, and other characteristics of the recorded shows which gives the possibility of a complete management of a particular category (for example all the tennis rebroadcasts), at any time and of any duration (even unknown in advance) and regardless of the channel carrying the show.

In addition when a telephone connection is joined to the system it allows not only transactions, games, prepayment etc. but also makes it possible to examine a panel of viewers and to evaluate the audience.

BRIEF DESCRIPTION OF THE DRAWINGS

In any case the invention will be better understood with the help of the description which follows with reference to the annexed schematic drawing showing by way of example several embodiments of the television-program management system wherein.

SPECIFIC DESCRIPTION

Figure 1:
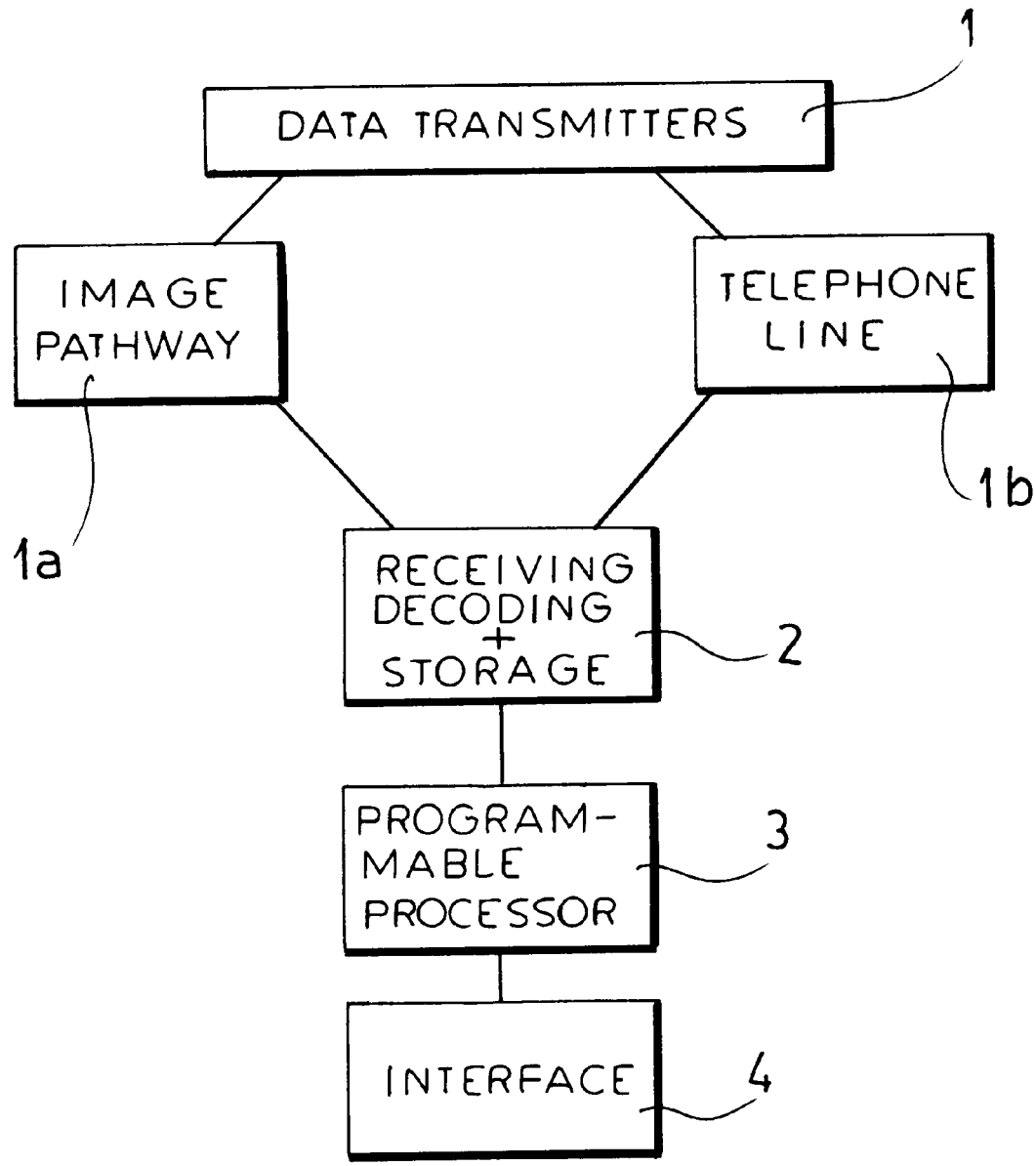
FIG. 1 is a block diagram of the principles of the system of this invention.
Figure 2:
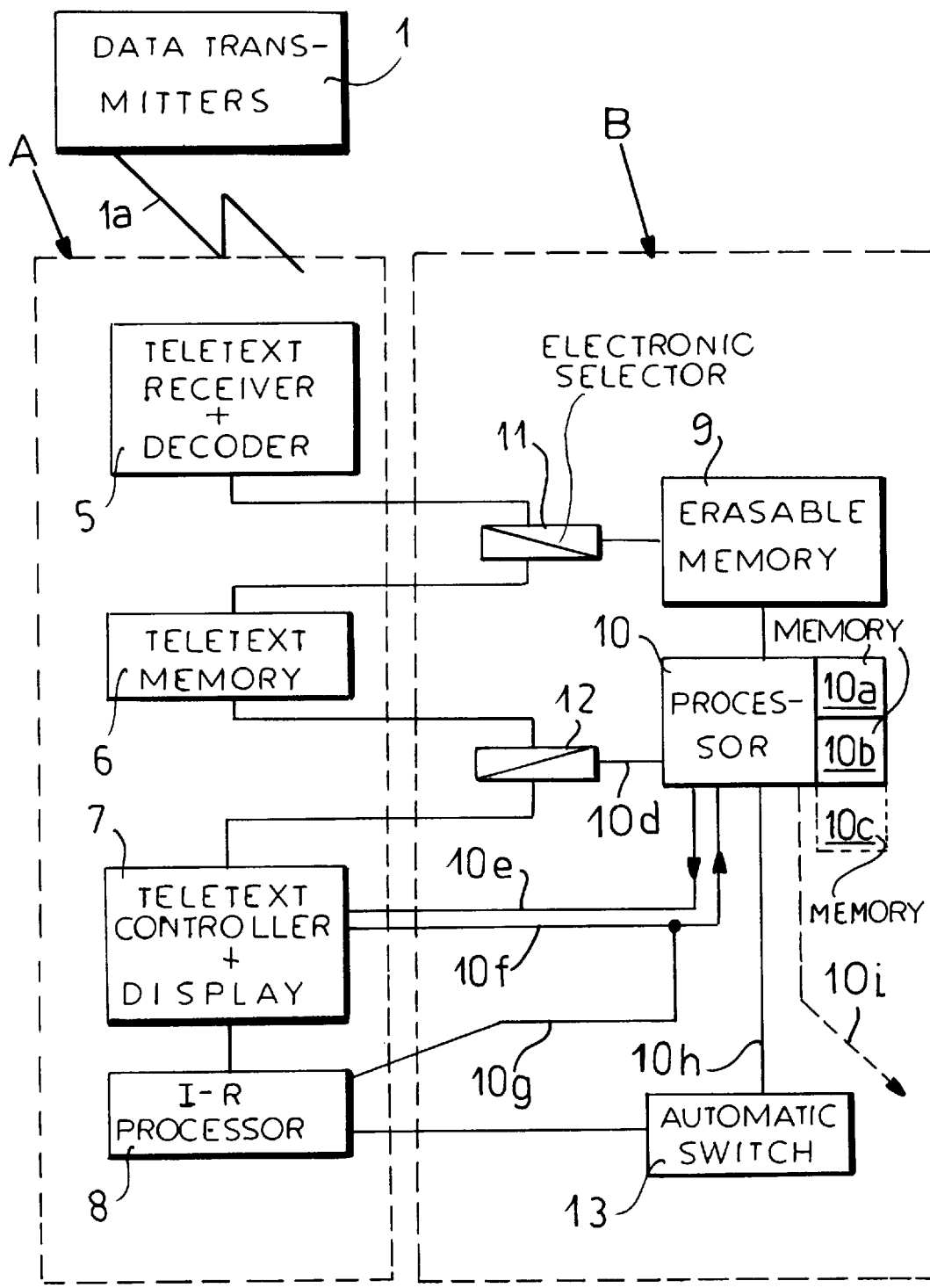
FIG. 2 is a detailed schematic showing mainly the programmable processing unit.

As shown in FIG. 1 the television-program managing system has data transmitters 1 either integrated in the television transmitter with teletext-type transmission along with the images 1a, thus by a radio or cable-network connection, or by telephone line 1b, or by a combination of these two pathways. At the user end, that is at the television, the system has means 2 which receive, decode, store, and display this data based on the teletext standard and which are associated with a programmable processing unit 3 having an erasable memory and an interface for controlling the various elements of the television. Reference 4 represents the actual interface allowing selection and operation. Thus this system allows information relative to the programs of the relevant channels to be transmitted, to be loaded into memory and to control operations taking this information into account, mainly by means of the programmable processor 3 shown more in detail (in a first embodiment) in FIG. 2.

In this figure reference 1 again designates the data transmitter, box A shows the existing devices connected with the teletext system, and box B shows the additional means belonging to the system of this invention and corresponding mainly to the functions of the programmable treatment unit.

The existing devices A include the teletext receiver and decoder 5, a teletext memory 6, a unit 7 for teletext control, display, and associated functions, and processing and treatment means 8 for infrared signals coming from the television remote controller (and/or from the keyboard eventually provided on the television).

The additional means B include a specific erasable memory 9 for storing the programs of the different channels, as well as the associated codes, connected to a processor 10 whose calculating power is adapted. An electronic selector 11 which operates when it receives a specific code selectively loads the teletext memory 6 or the program memory 9 of the processor 10, the selector 11 being connected between the receiver and teletext decoder 5 on the one side and the two memories 6 and 9 on the other.

The processor 10 has a reprogrammable and remotely controlled memory 10a as well as a nonvolatile fixed-program memory 10b holding the operating program for this processor. An optional program memory 10c for the display can also be added on (videotheque function).

The processor 10 has a connection 10d for controlling the display of data specific to the programs connected to a selector 12 between the teletext memory 6 and the teletext display 7. Another connection 10e between the processor 10 and the controller and display 7 ensures that the processor 10 controls the teletext functions in several different ways (display alone or display on top of the picture, signalling method, etc.). A return connection 10f feeds to the processor 10 signals received by the teletext controller 7 in particular those coming from the controller of the television for managing and initiating certain procedures. Another connection 10g associated with the last one ensures the reception via the processor 10 of signals coming directly from the remote controller or from the keyboard of the television and specific to the functions of the processor 10, for example: alphanumeric sorting, start and end functions, etc.

A connection 10h via which travel the commands for changing channel extends from the processor 10 to the automatic switching system 13 for the television channels which itself is connected to the receiver 8 of signals from the remote controller and/or from the keyboard of the television.

Finally an optional control connection 10i connects the processor 10 with a videocassette recorder (not shown).

Thus the programmable processing unit of the invention connected to the teletext display whose functions are used allows one to:

recognize data emitted by the transmitter 1 thanks to a specific recognition code activating the loading into the memory 9 of this data, in particular the programs of the different channels, and controlled by the transmitter 1 or a preset choice of the viewer, either emit a data signal showing the start of a selected program on another channel (regardless of what channel is currently being watched) or automatically set the television with the switch 13 to the selected channel.

In addition to controlling such operations the system allows a person using simple commands to display on the screen of the television information such as the programs of the different channels or information selected and sorted, for example, by type or style of show.

The processor 10 itself is programmable at any time remotely so that any other combination, possibility of selection, or remote command is possible without having to actually modify the system.

It is to be noted that the use of the system implies that it is initialized. Thus before knowing all of the available television programs and being ready to display and process them, it is important to initialize the system by commanding it to sweep all the channels received to obtain all the data. This sweep can be done by using the tuner of the television, in an older television or in a newer television a function like that known in the picture-in-picture systems which makes it possibility to capture data from other channels while watching one channel, the sweep being made in the background without being seen by the viewer.

Figure 3:
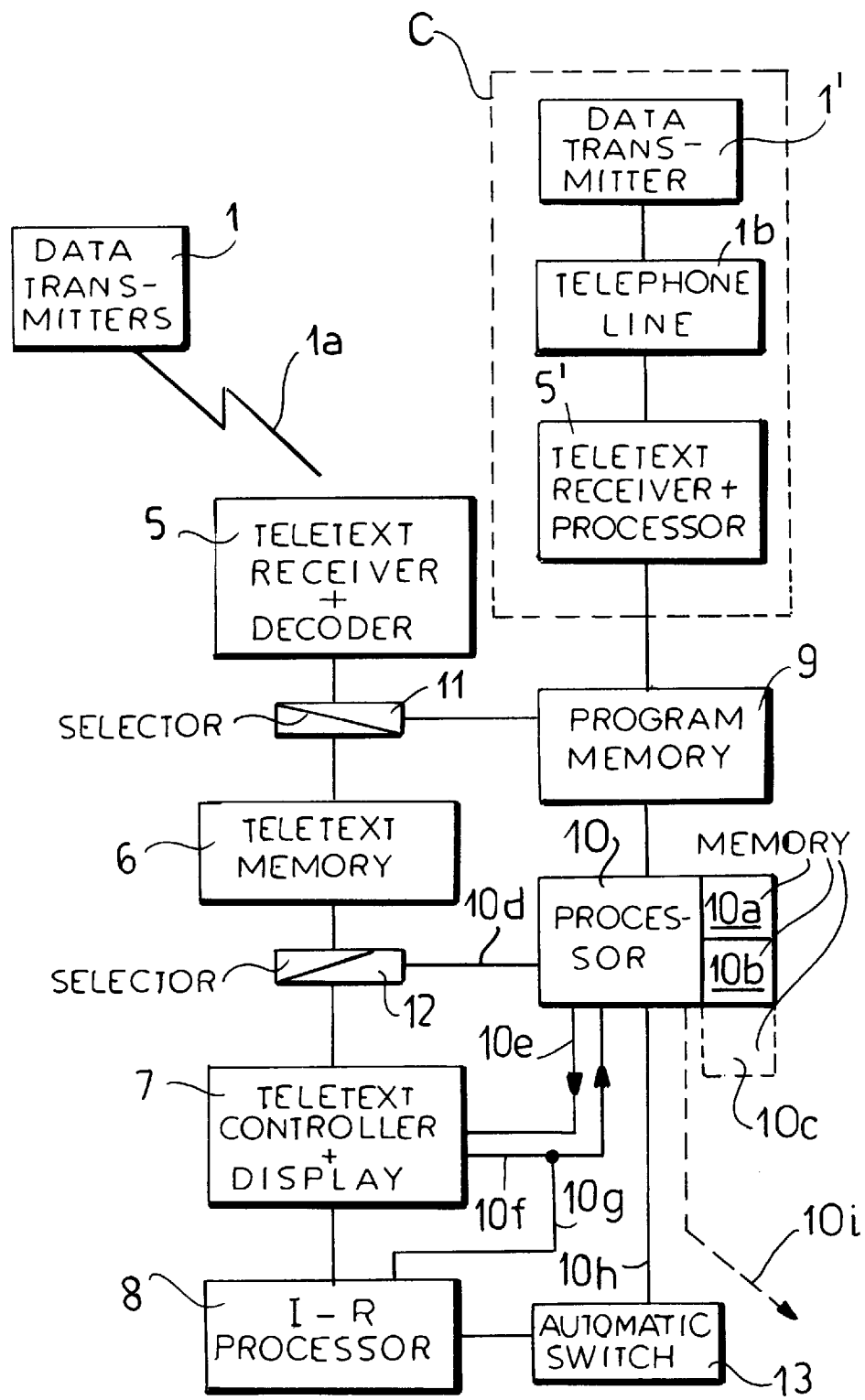
FIGS. 3, 4, and 5 are views similar to FIG. 2 showing variants on the system according to the invention.

FIG. 3, where elements described above are identified with the same references, shows a system also having a system for downloading data of the same type or other information by the telephone line, a device indicated in general by box C. The assembly C has, in addition to the actual telephone line 1b, a unit 1' for transmitting data, a unit for dialing the telephone (not shown separately) which can be a simple screen- or keypad-equipped telephone connected in parallel to the telephone line 1b, and a unit 5' for receiving and processing in accordance with teletext standards the signals received through the telephone line 1b. The processing and receiving unit 5' is itself connected to the program memory 9 described above and thus ensures that this memory is loaded with the data transmitted through the telephone line 1b. The processing of this data and controlling the display or particular operations taken based on this data, take place without changes relative to the described made above with reference to FIG. 2.

Figure 4:
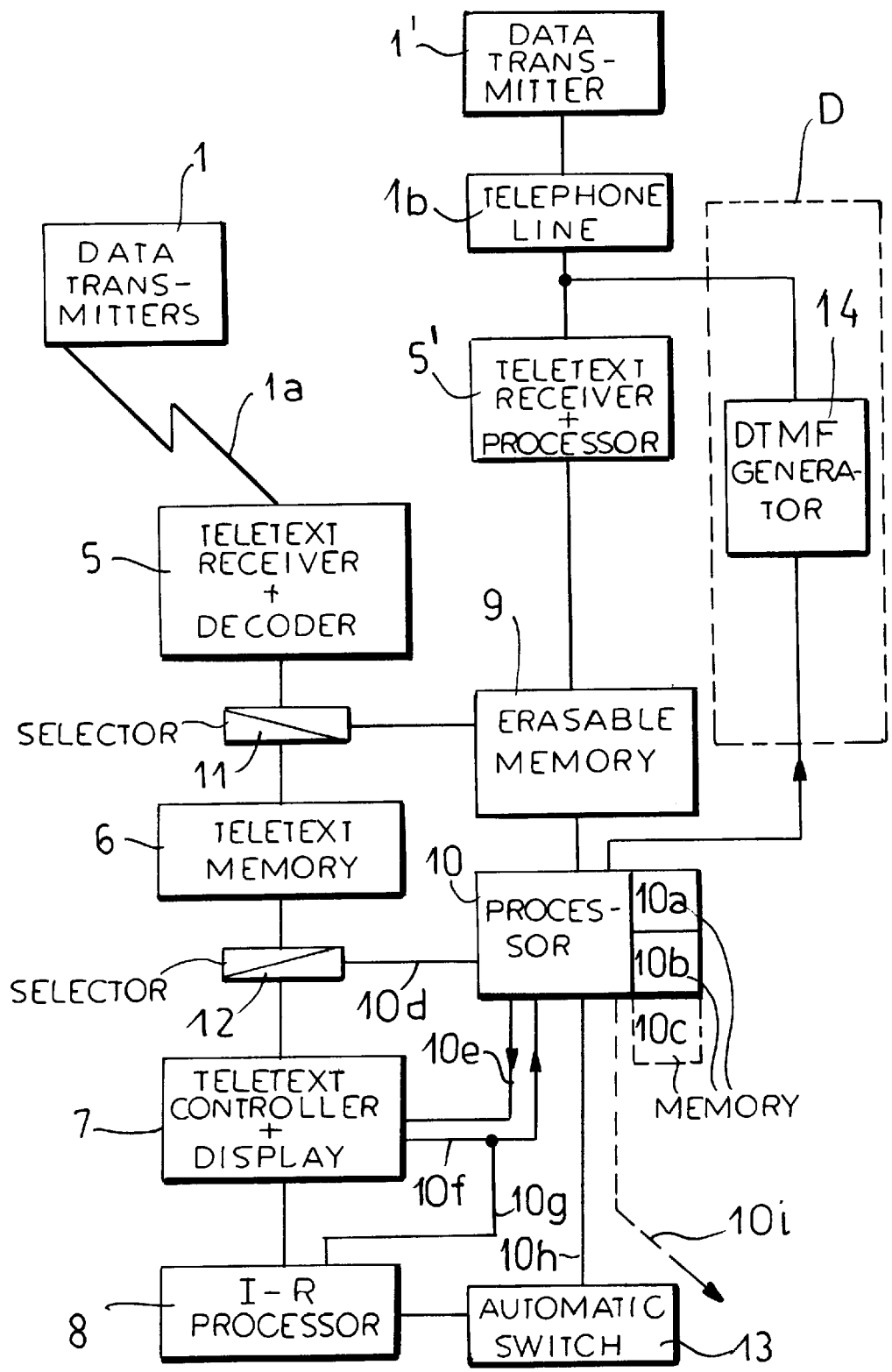

FIG. 4 shows a system according to the invention again using a telephone connection for downloading data, but made interactive by the addition of a device D for generating and emitting audio signals that can be sent on the same telephone line 1b. The device D can have, more particularly, a unit 14 for generating DTMF signals which are controlled directly by the viewer thanks to his remote control and an additional connection 10k between the processor and the unit 14. The DTMF signals can be composed on a standard telephone keypad or by means of a DTMF generator integrated in the television, these signals being triggered in the latter case by the remote control. The DTMF unit can sense a coded signal identifying the viewer if the viewer needs this security or needs to be identified accurately. Whatever is used as DTMF generator 14, this unit allows direct response from the viewer to the menu or other questions displayed on the television screen thereby allowing all sorts of interactive operations.

Figure 5:
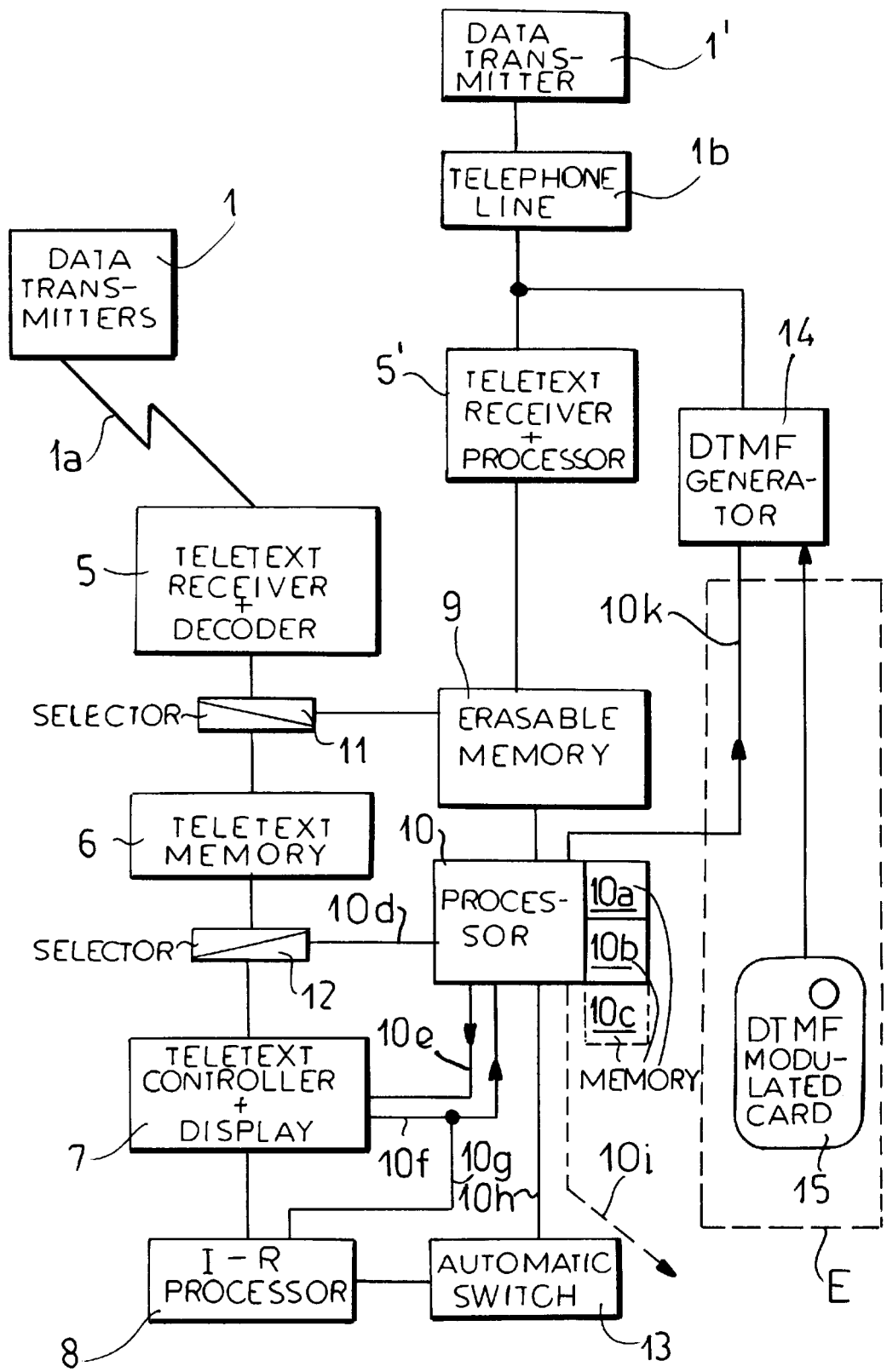

Finally, FIG. 5 shows a system to which is added an optional module E provided for a coded DTMF-modulated card 15; in this case no DTMF modulation device is provided in the television or in an external housing but the television has a simple reader for DTMF cards. When inserted into the reader the card 15 which is similar to a standard credit card can deliver an encoded DTMF signal of n signals to for example validate a payment, a purchase, a response for a game, etc. in particular by initiating the output of a starting value (for a prepaid card).

Thus the interactivity can be done in a simple and individualized manner, the transmitting unit sending out the same information to all the receivers but only the receiver which identifies itself by a particular number can recover, that is decode and display the information of particular interest to the viewer having this receiver. In this manner, for example, only the winner of the game is informed about whether or not he has won and/or how much he has won. There is thus a certain type of individual addressing.

It goes without saying that the invention is not limited to the embodiments of this system of managing television programs that has been described above by way of example; it includes on the contrary all the variations of execution and application using the same principle. In particular one does not leave the scope of the invention by using any means equivalent to those described or by adding optional supplementary functions such as display of advertising based on downloaded data or management of interactive games or even by combining the optional functions in a manner different from the particular combinations illustrated by the figures.

I claim:

1. A system for managing television programs comprising:

means for transmitting data relative to programs according to a preestablished format of teletext, means for receiving, decoding, storing, and displaying data of teletext integrated into a television set;

a programmable processing unit for said data for controlling the operation of the television set or of a videocassette recorder based on this data;

interface means allowing selection and actions; and a program memory, data about programs being loaded into said program memory, said program memory being connected to the means for receiving, decoding, storing and displaying data, said programmable processing unit being formed with a processor which is connected with the program memory and which includes an erasable memory allowing the downloading of variable data having to do with programs of television channels as well as recording of choices effected by the viewer, said programmable processing unit being connected to a teletext display or to control means of the television set for selecting a channel being watched, the processor having connections that control the display of data about programs and including a switching device between a program processor and a processing and treatment means, an electronic selector being interposed between the between a teletext receiving and decoding means, the teletext memory, and the program memory, the selector acting when a specific code is received to send selected data to the program memory and to the processor.

2. The television-program management system according to claim 1, wherein transmission of data relative to the programs between the means for transmitting data and the means for receiving, decoding, storing and displaying is ensured by a pathway of image transmission and/or by a telephone connection.

3. The television-program management system according to claim 1, wherein an assembly formed by the television set and any remote controller includes means for remotely controlling the display on the television screen of the information as to all the programs and/or programs selected by a viewer, this display of information taking place alone or superposed on the image of a show being watched.

4. The television-program management system according to claim 3, wherein, for automatic control of channel changes based on the data received and processed, the processor has a connection to an automatic switching device for television channels.

5. The television-program management system according to claim 1, wherein for controlling said videocassette recorder, the processor has a program memory for the recorder as well as a connection with said recorder.

6. The television-program management system according to claim 5 comprising a telephone connection between the transmitter means and the data-receiving means, and including means for generating audio signals and for sending said audio signals over the telephone line, said means for generating said audio signals, said audio signals being connected with the processor.

7. The television-program management system according to claim 6, further comprising means for generating or transmitting audio signals based on a smart card.

8. A system for managing television programs comprising:

means for transmitting data relative to programs according to a preestablished format of teletext, means for receiving, decoding, storing, and displaying data of teletext integrated into a television set;

a programmable processing unit for said data for controlling the operation of the television or of a videocassette recorder based on this data;

interface means allowing selection and actions; and a program memory, data about programs being loaded into said program memory, said program memory being connected to the means for receiving, decoding, storing and displaying data, said programmable processing unit being formed with a processor which is connected with the program memory and which includes an erasable memory allowing the downloading of variable data having to do with programs of television channels as well as recording of choices effected by a viewer, said programmable processing unit being connected to a teletext display or to control means of the television set for selecting a channel being watched, an automatic switching device connected to said processor being provided for automatic control of channel changes based upon data received and processed, an electronic selector being interposed between a teletext receiving and decoding means, the teletext memory, and the program memory, the selector acting when a specific code is received to send selected data to the program memory and to the processor.

* * * * *